(12) United States Patent
Sindhu et al.

(10) Patent No.: US 7,317,721 B1
(45) Date of Patent: Jan. 8, 2008

(54) SYSTEMS AND METHODS FOR MEMORY UTILIZATION DURING PACKET FORWARDING

(75) Inventors: Pradeep Sindhu, Los Altos Hills, CA (US); Raymond M. Lim, Los Altos Hills, CA (US); Dennis C. Ferguson, Palo Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1173 days.

(21) Appl. No.: 10/120,380

(22) Filed: Apr. 12, 2002

(51) Int. Cl.
*H04L 12/56* (2006.01)
(52) U.S. Cl. .................. 370/389; 370/390; 370/428
(58) Field of Classification Search .............. None
See application file for complete search history.

(56) References Cited

U.S. PATENT DOCUMENTS

| | | | |
|---|---|---|---|
| 5,032,987 A | 7/1991 | Broder et al. | 364/200 |
| 6,052,683 A | 4/2000 | Irwin | 707/8 |
| 6,337,861 B1 | 1/2002 | Rosen | 370/389 |
| 6,392,996 B1 | 5/2002 | Hjalmtysson | 370/252 |
| 6,724,767 B1 * | 4/2004 | Chong et al. | 370/412 |
| 6,888,847 B2 * | 5/2005 | Ueno | 370/469 |
| 6,912,217 B1 * | 6/2005 | Vogel | 370/389 |
| 2003/0120806 A1 * | 6/2003 | Clune et al. | 709/238 |
| 2003/0165140 A1 * | 9/2003 | Tang et al. | 370/393 |

OTHER PUBLICATIONS

Memory Organization Scheme For The Implementation Of Routing Tables In High Performance IP Routers; 1993; IBM Technical Disclosure Bulletin; vol. 36(2); pp. 151-153.

Local Area Network Switch Frams Lookup Technique For Increased Speed And Flexibility; 1995; IBM Technical Disclosure Bulletin; vol. 38, (7); pp. 221-222.

M. Degermark et al.; Small Forwarding Tables For Fast Routing Lookups; ACM SIGCOMM'97 Conference; Applications, Technologies, Architectures, and Protocols for Computer Communication; Sep. 14-18, 1997, Cannes, France; Computer Communication Review (1997) vol. 27, No. 4; pp. 3-14.

M. Waldvogel et al.; Scalable High Speed IP Routing Lookups; ACM SIGCOMM'97 Conference; Applications, Technologies, Architectures, and Protocols for Computer Communication; Sep. 14-18, 1997, Cannes, France; Computer Communication Review (1997); vol. 27; No. 4; pp. 25-28.

U.S. Appl. No. 09/336,311, filed Jun. 18, 1999; Qin Zheng et al.; A Quality of Service Facility In A Device For Performing IP Forwarding And ATM Switching; 102 pages.

(Continued)

*Primary Examiner*—Huy D. Vu
*Assistant Examiner*—Toan Nguyen
(74) *Attorney, Agent, or Firm*—Harrity Snyder, LLP

(57) ABSTRACT

A network device includes a memory and a packet forwarding engine. The memory stores a multicast list table, tag descriptor data and layer 2 (L2) encapsulation data. The packet forwarding engine receives a first pointer to an entry in the multicast list table, the entry including a second pointer to the tag descriptor data. The packet forwarding engine utilizes the second pointer to retrieve the tag descriptor data, the tag descriptor data including a third pointer to the encapsulation data. The packet forwarding engine constructs a packet header utilizing the retrieved encapsulation data and appends the packet header to a packet payload for forwarding out of the packet forwarding engine.

21 Claims, 8 Drawing Sheets

OTHER PUBLICATIONS

U.S. Appl. No. 09/336,229, filed Jun. 18, 1999; Steven R. Willis; Device for Performing IP Forwarding And ATM Switching; 62 pages.

U.S. Appl. No. 09/336,090, filed Jun. 18, 1999; Frank Kastenholz et al.; An Interconnect Network For Operation Within A Communication Node; 57 pages.

U.S. Appl. No. 09/335,947, filed on Jun. 18, 1999; Gregg Bromley et al.; Method And System For Encapsulating/Decapsulating Data On A Per Channel Bases In Hardware; 59 pages.

U.S. Appl. No. 09/237,128, filed Jan. 25, 1999, Frank Kastenholz; Network Packet Fowarding With A Reduced Number of Memory Accesses; 47 pages.

* cited by examiner

SYSTEMS AND METHODS FOR MEMORY UTILIZATION DURING PACKET FORWARDING

BACKGROUND OF THE INVENTION

1. Field of the Invention

The present invention relates generally to data routing systems, and more particularly, to systems and methods for improving memory utilization during packet forwarding in data routing systems.

2. Description of Related Art

Conventional networks typically include routers that route packets from one or more sources to one or more destinations. A packet is a format in which data can be transmitted through a network. A router is a switching device that receives packets containing data or control information at input ports and, based on destination or other information included in the packets, routes the packets through output ports to the destinations or intermediary destinations. Conventional routers determine the proper output port for a particular packet by evaluating header information included in the packet.

Conventional routers include packet forwarding engines and switch fabrics for receiving and forwarding incoming packets to their intended destinations. To forward incoming packets from an input port to an output port, routers typically must perform complex data manipulation actions. Such data manipulation actions include storing and retrieving encapsulation data required for constructing outgoing packet headers and forwarding outgoing packets. Conventionally, the encapsulation data utilized in packet forwarding is stored in memory, such as SRAM. Unfortunately, SRAM density has not increased to keep up with the steadily increasing memory demands of the router. Thus, as the memory demands of the router increase, the need for improved data structures for preserving memory space has become very important.

Therefore, there exists a need for improved data structures and memory utilization mechanisms in router packet forwarding processes that can conserve memory space and, thereby, reduce memory demands on router memory.

SUMMARY OF THE INVENTION

Systems and methods consistent with the principles of the invention address this and other needs by implementing a data structure for storing encapsulation data that conserves memory space by linking multiple tag descriptors to encapsulation data that is common to all of the tag descriptors. Conventionally, the common encapsulation data would be replicated for each instance of the tag descriptor, thus, wasting memory space. By separating the tag descriptor (e.g., an MPLS descriptor) from the encapsulation data, SRAM memory usage is improved. A data structure consistent with the principles of the invention, thus, conserves memory space and reduces memory demands on router SRAM.

One aspect consistent with principles of the invention is directed to a data structure encoded on a computer-readable medium. The data structure includes first data comprising a plurality of layer descriptors, each of the plurality of layer descriptors comprising encapsulation data utilized for constructing a packet header. The data structure further includes second data comprising one or more tag descriptor data and associated layer descriptor pointers, the one or more tag descriptor data utilized for network traffic engineering and each of the associated layer descriptor pointers pointing to a respective layer descriptor of the plurality of layer descriptors. The data structure also includes third data comprising a multicast list, each entry of the multicast list comprising at least one of a tag descriptor pointer and a layer descriptor pointer, each tag descriptor pointer pointing to a respective tag descriptor data of the one or more tag descriptor data and each layer descriptor pointer pointing to a respective layer descriptor of the plurality of layer descriptors.

A second aspect consist with principles of the invention is directed to a method of constructing a packet. The method includes receiving a first pointer to an entry in a multicast list table, the entry comprising a second pointer to tag descriptor data stored in memory. The method further includes utilizing the second pointer to retrieve the tag descriptor data, the tag descriptor data comprising a third pointer to encapsulation data stored in the memory. The method also includes utilizing the third pointer to retrieve the encapsulation data, constructing a packet header utilizing the retrieved encapsulation data, and appending the packet header to a packet payload.

BRIEF DESCRIPTION OF THE DRAWINGS

The accompanying drawings, which are incorporated in and constitute a part of this specification, illustrates embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention implement a data structure for storing encapsulation data that conserves memory space by linking multiple tag descriptors to encapsulation data that is common to all of the tag descriptors. Through separation of the tag descriptor (e.g., an MPLS descriptor) from the encapsulation data, memory is conserved and memory demands on router memory is reduced.

Exemplary System

Figure 1:
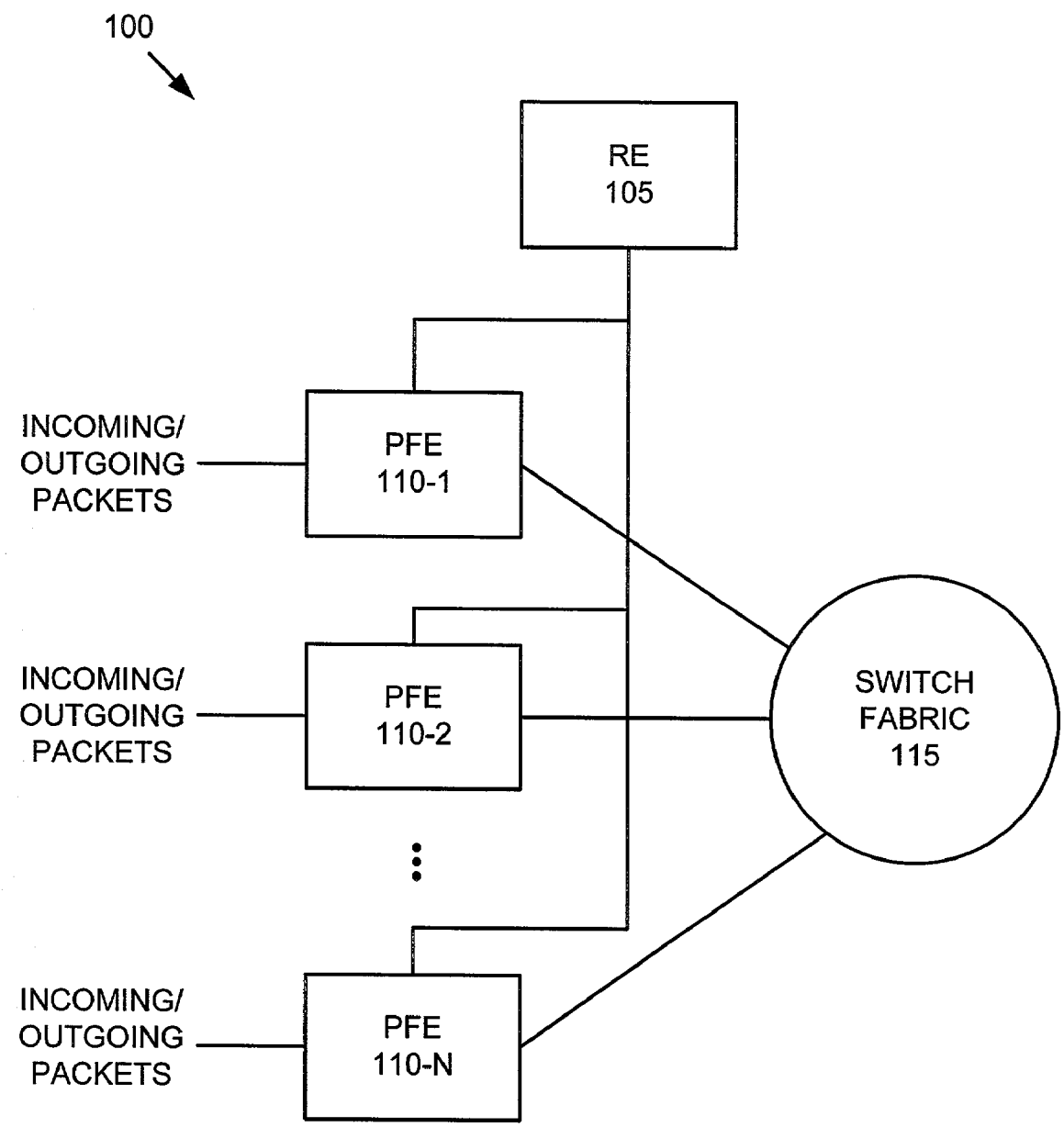
FIG. 1 is a diagram of an exemplary router system in which systems and methods consistent with the principles of the invention may be implemented.

FIG. 1 is a diagram of an exemplary router 100 in which systems and methods consistent with the principles of the invention may be implemented. Router 100 may receive one or more packet streams from a communications link, process the stream(s) to determine destination information, and transmit the stream(s) on one or more links in accordance with the destination information.

Router system 100 may include a routing engine (RE) 105 and multiple packet forwarding engines (PFEs) 110-1-110-N interconnected via a switch fabric 115. Switch fabric 115 may include one or more switching planes to facilitate communication between two or more of PFEs 110. In an implementation consistent with the principles of the invention, each of the switching planes may include a three-stage switch of crossbar elements.

RE 105 performs high-level management functions for router 100. For example, RE 105 communicates with other networks and systems connected to router 100 to exchange information regarding network topology. RE 105 may create routing tables based on network topology information, create forwarding tables based on the routing tables, and send the forwarding tables to PFEs 110. PFEs 110 may use the forwarding tables to perform route lookups for incoming packets. RE 105 also performs other general control and monitoring functions for router 100.

Each PFE 110-1-110-N connects to RE 105 and switch fabric 115. Each PFE 110-1-110-N receives packets on links connected to another device or a network, such as a wide area network (WAN), local area network (LAN), or a wireless network. Each link could be one of many types of transport media, such as optical fiber or Ethernet cable. The packets may be formatted according to one of several protocols, such as the synchronous optical network (SONET) standard or Ethernet.

Figure 2:
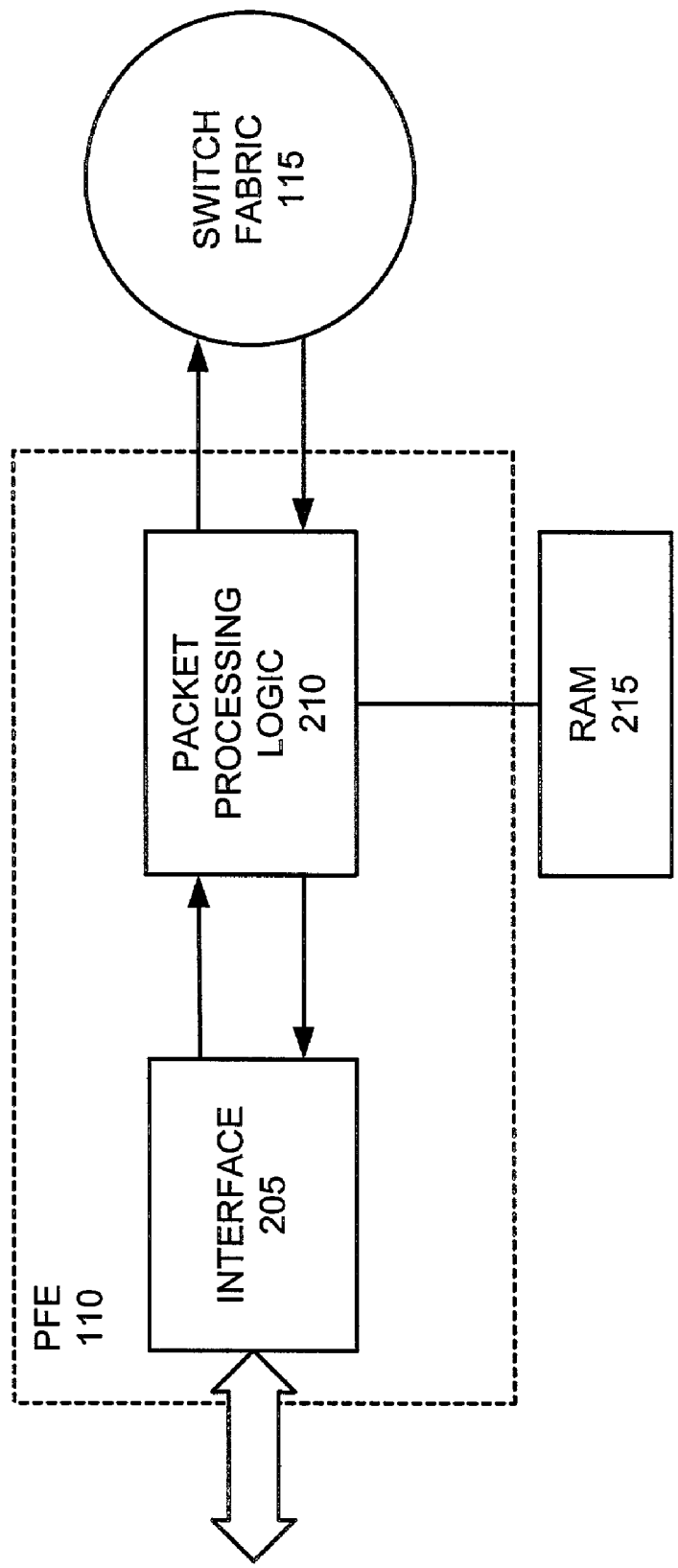
FIG. 2 is a diagram of an exemplary packet forwarding engine according to an implementation consistent with the principles of the invention.

FIG. 2 is an exemplary diagram of a PFE 110 according to an implementation consistent with the principles of the invention. PFE 110 may include an interface 205 and packet processing logic 210. Interface 205 connects to the communication links. Packet processing logic 210 may process packets received from the links and prepare packets for transmission on the links. For packets received from the links, packet processing logic 210 may strip the layer-2 (L2) and layer-3 (L3) header information from the packets, fragment each of the packets into one or more cells, and pass the cells to switch fabric 115. Switch fabric 115 may deliver the cells to an appropriate output PFE 110. For packets to be transmitted on the link, packet processing logic 210 may receive cells from other PFEs 110, via switch fabric 115, and re-packetize the cells before sending the packet out via interface 205.

Packet processing logic 210 may retrieve encapsulation data from a computer-readable medium, such as RAM 215, for constructing a packet header to append the packet header to outgoing packets. RAM 215 may further store multicast list tables for sending multiple copies of a packet within a stream, but using different encapsulation or destination address for each copy. RAM 215 may additionally store tag descriptor data that may be utilized for traffic engineering and L2 descriptor data that includes the encapsulation data for constructing a L2 packet header for each outgoing packet.

Exemplary Multicast List Table

Figure 3:
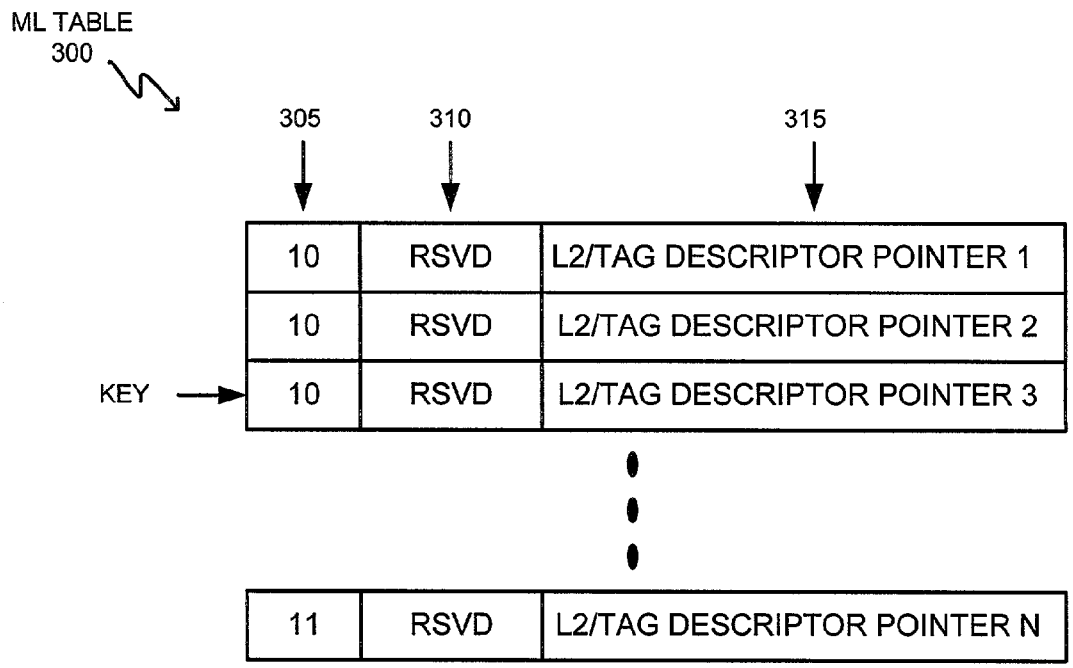
FIG. 3 is a diagram of an exemplary multicast list table according to an implementation consistent with principles of the invention.

FIG. 3 is an exemplary diagram of a multicast list table 300 stored in RAM 215 according to an implementation consistent with principles of the invention. Multicast list table 300 may include multiple entries that each may include a field 305 that indicates whether there are more entries in list table 300, a reserved field 310, and a L2/tag descriptor pointer field 315 that includes either a pointer to tag descriptor data or L2 descriptor data. Multicast list table 300 may, in some embodiments, be fragmented into 64 entry blocks. If multicast list table 300 includes more than 64 entries, then one or more multiples (as necessary) of the 64 entry blocks may be allocated in RAM 215 and linked together.

Exemplary Tag Descriptor Data

Figure 4:
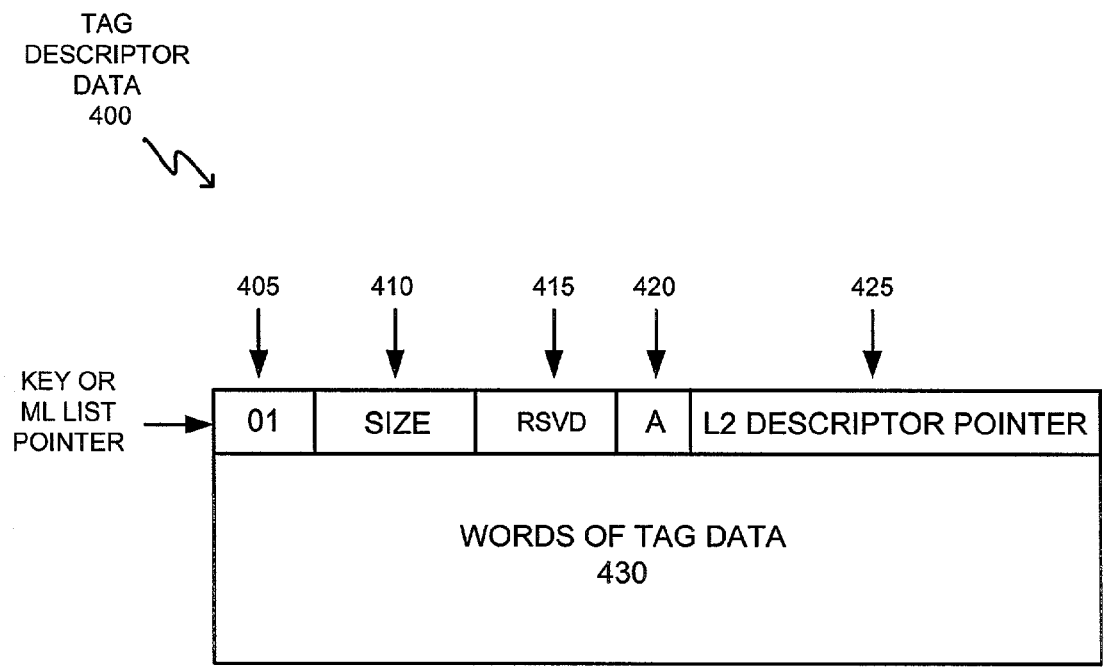
FIG. 4 is a diagram of exemplary tag descriptor data according to an implementation consistent with principles of the invention.

FIG. 4 is an exemplary diagram of tag descriptor data 400, such as the tag descriptor data pointed to by L2/tag descriptor pointer field 315 according to an implementation consistent with principles of the invention. Tag descriptor data 400 may include a tag value 405 that indicates that the data includes tag descriptor data, a size value 410 that indicates the number of tag descriptor words, a reserved field 415, an accounting mode flag 420, an L2 descriptor pointer 425 and tag data 430. Accounting mode flag 420 may indicate whether additional accounting bytes (not shown) are appended to tag descriptor data 400. L2 descriptor pointer 425 may point to a location of L2 descriptor data in RAM 215 of an outgoing PFE 110. Tag data 430 may contain a plurality of bits that are used for network traffic engineering, such as, for example, use with a label switching protocol, such as the MPLS protocol.

Exemplary L2 Descriptor Data

Figure 5:
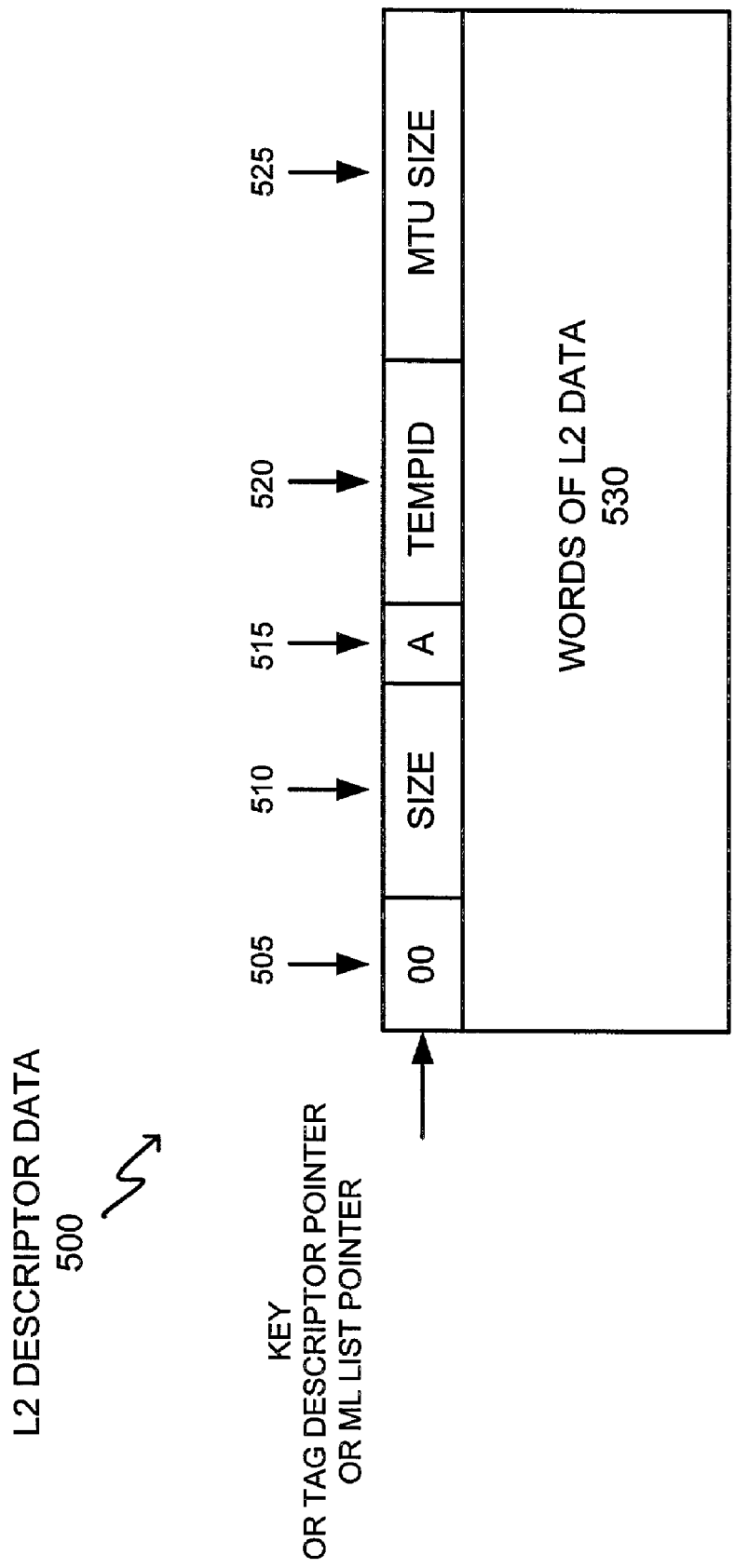
FIG. 5 is a diagram of exemplary L2 descriptor data according to an implementation consistent with principles of the invention.

FIG. 5 is an exemplary diagram of L2 descriptor data 500 according to an implementation consistent with principles of the invention. L2 descriptor pointer 425 may point to L2 descriptor data 500. L2 descriptor data 500 may include an L2 key 505 with a value of 00, for example, that indicates the data is L2 descriptor data. L2 descriptor data 500 may further include a size value 510, an accounting mode flag 515, a TempID field 520, an MTU size field 525, and an L2 data field 530. Size value 510 may indicate a number of L2 descriptor words in L2 data field 530. Accounting mode flag 515 may indicate whether additional accounting bytes (not shown) are appended to L2 descriptor data 500. TempID field 520 may indicate a location in memory where a fixed portion of the packet encapsulation data may be found. MTU size field 525 may indicate a maximum transfer allowed, which may be, for example, in bytes. L2 data field 530 may include the words of L2 encapsulation data required for constructing the L2 packet header.

Exemplary Data Traversal

Figure 6:
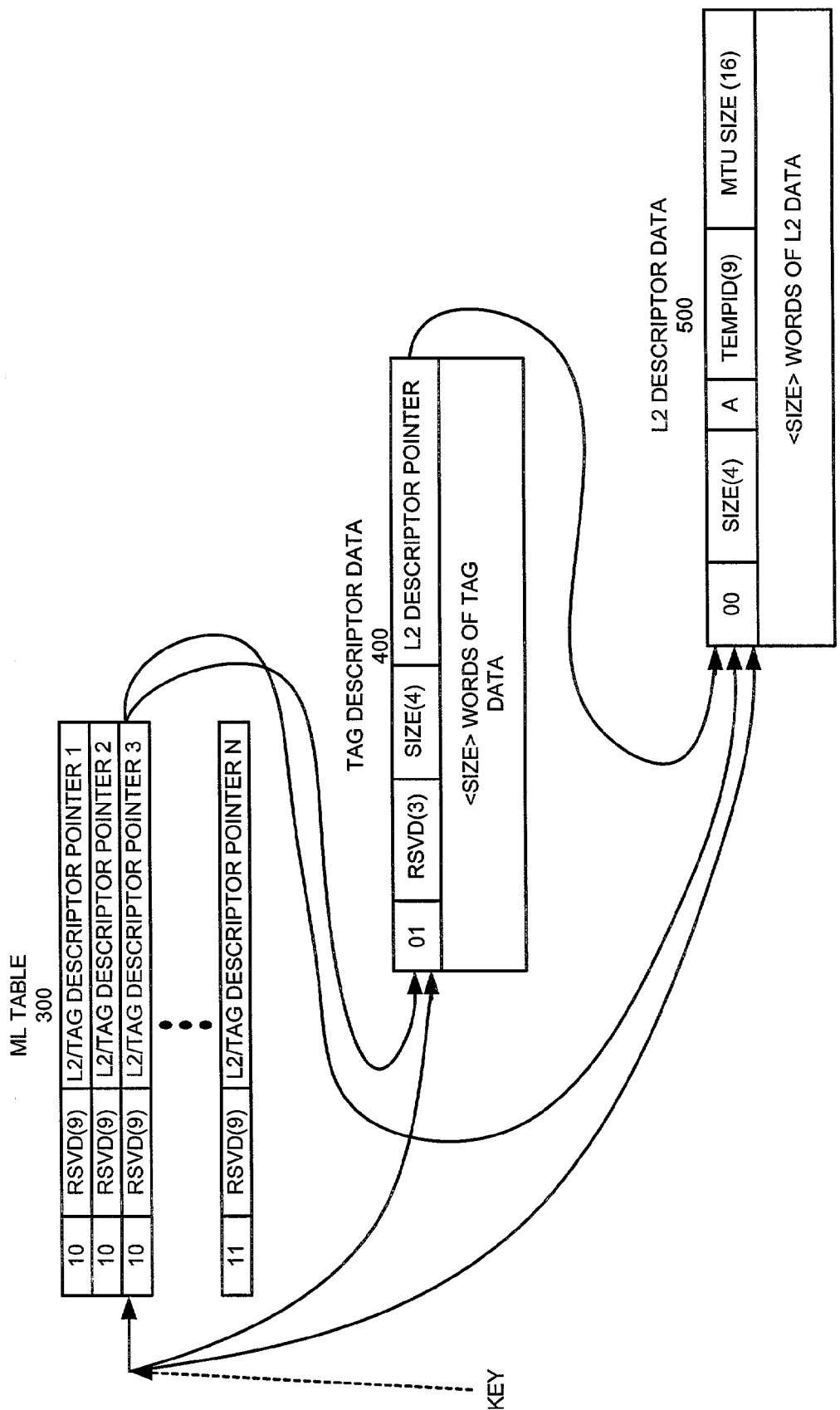
FIG. 6 is a diagram of an exemplary traversal of a multicast list table, tag descriptor data, and L2 descriptor data according to an implementation consistent with principles of the invention.

FIG. 6 is an exemplary diagram of a traversal of multicast list table 300, tag descriptor data 400 and L2 descriptor data 500 according to an implementation consistent with principles of the invention. FIG. 6 illustrates the various ways in which a key received at outgoing packet processing logic 210 of a PFE 110 may be utilized to traverse a multicast list table 300, tag descriptor data 400, and L2 descriptor data 500 to retrieve L2 encapsulation data for constructing an L2 packet header. For example, a key produced at an input packet forwarding engine may translate, at an output packet forwarding engine, to a location of a multicast list table 300 entry in RAM 215 that may include a pointer to tag descriptor data 400. The tag descriptor data 400 may include a pointer to L2 descriptor data 500 that also may include words of L2 data. The L2 data may include encapsulation data utilized for constructing a packet header for an outgoing packet.

As another example, the key may translate, at the output packet forwarding engine, to a location of tag descriptor data 400 in RAM 215. This tag descriptor data 400 may include a pointer to L2 descriptor data 500 that includes encapsulation data for constructing a packet header. As a further example, the key may translate to a location of L2 descriptor data 500 in RAM 215 that includes the encapsulation data for constructing a packet header.

Exemplary Packet

Figure 7:
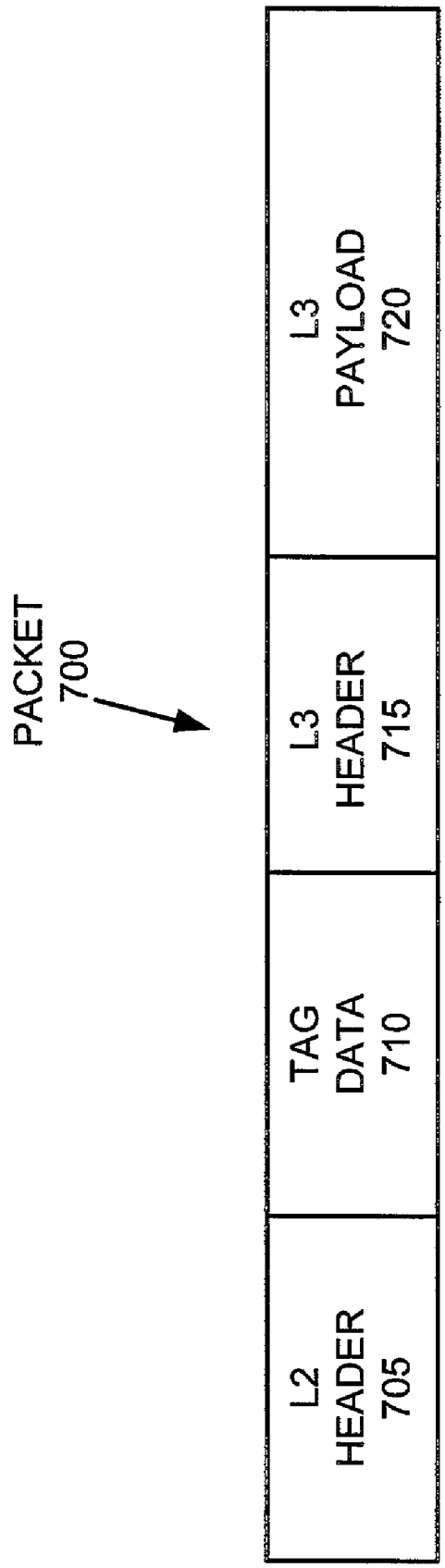
FIG. 7 is a diagram of an exemplary packet according to an implementation consistent with principles of the invention.

FIG. 7 is an exemplary diagram of a packet 700 according to an implementation consistent with principles of the invention. Packet 700 may include an L2 header 705, tag data 710, an L3 header 715, and an L3 payload 720. L2 header 705 may be constructed through the traversal of a multicast list table 300, tag descriptor data 400, and L2 descriptor data 500 to retrieve L2 encapsulation data. Tag data 710 may be retrieved from tag descriptor data 400. L2 header 705 and tag data 710 may be appended to a conventional L3 header 715 and L3 payload 720 to construct packet 700.

Exemplary Packet Forwarding Process

Figure 8:
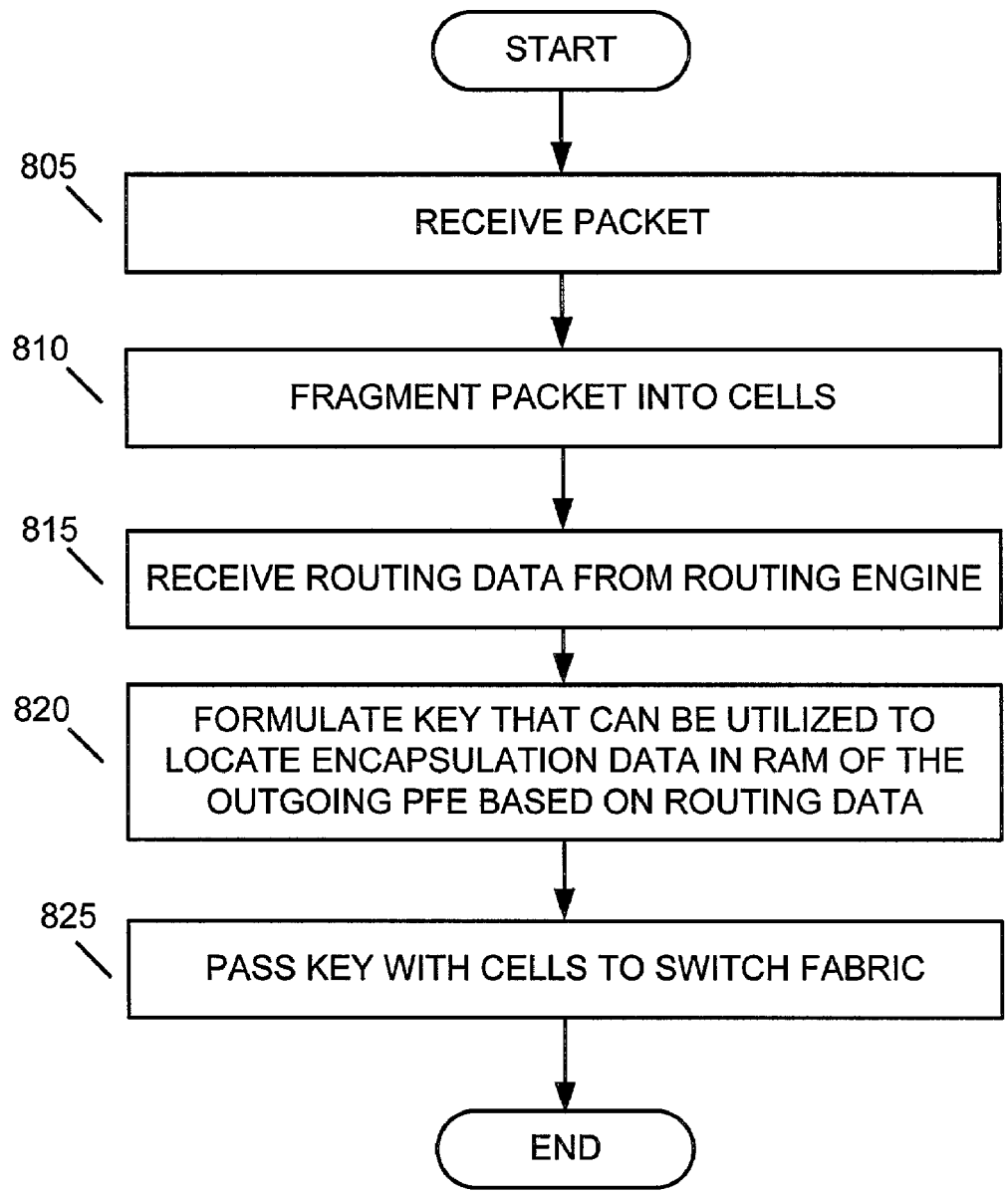
FIGS. 8-9 are flowcharts of an exemplary process for forwarding a packet received at a routing system according to an implementation consistent with principles of the invention.
Figure 9:
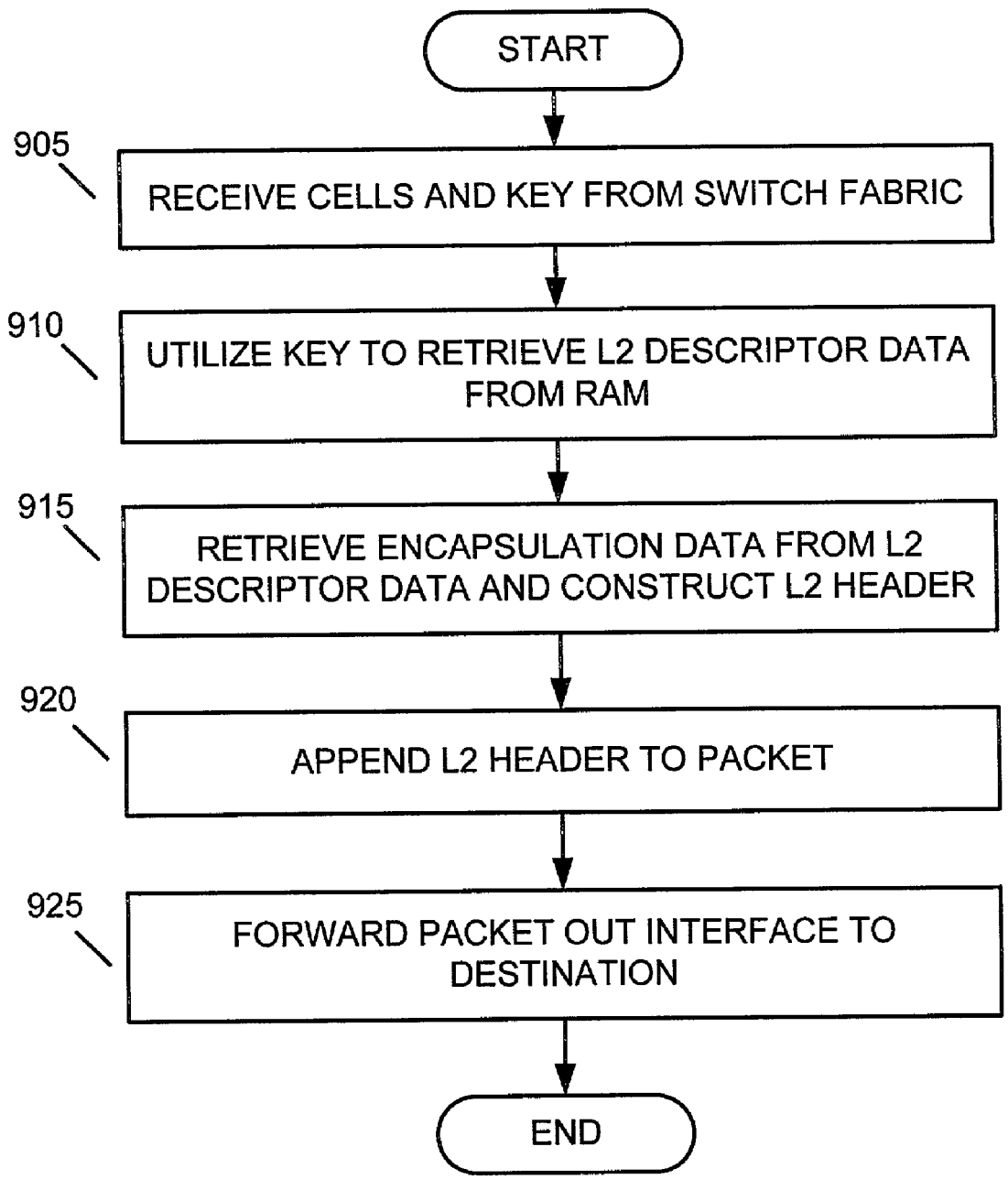

FIGS. 8-9 are flowcharts of an exemplary process for forwarding a packet received at routing system 100. FIG. 8 illustrates processing of an incoming packet. The exemplary process may begin with the reception of an incoming packet by a PFE 110 of routing system 100 (act 805). The packet may then be fragmented into cells by packet processing logic 210 (act 810). The cells may be fixed length data structures such as, for example, 64 byte data structures. Routing data may be received from routing engine 105 at packet processing logic 210 (act 815). A key that can be utilized to locate encapsulation data in RAM 215 of the outgoing PFE may be formulated by packet processing logic 210 based on the received routing data (act 820). The formulated key and the cells may then be passed to switch fabric 115 (act 825) by, for example, packet processing logic 210.

FIG. 9 illustrates processing of an outgoing packet. An appropriate outgoing PFE 110 may receive the key and cells from switch fabric 115 (act 905). The key may be utilized by packet processing logic 210 to retrieve L2 descriptor data 500 from RAM 215 (act 910). For example, as shown in FIG. 6, the key may translate to a location of an entry in multicast list table 300. The L2/tag descriptor pointer may be retrieved and utilized to retrieve either tag descriptor data 400 or L2 descriptor data 500 from RAM 215. Alternatively, the key may translate to a location of tag descriptor data 400 in RAM 215. An L2 descriptor pointer 420 may be retrieved from the tag descriptor data 400 and utilized to retrieve L2 descriptor data 500 from RAM 215. As another alternative, the key may translate to a location of L2 descriptor data 500 in RAM 215.

Once L2 descriptor data 500 is located in RAM 215, the L2 encapsulation data 530 may be retrieved from the L2 descriptor data 500 and an L2 header 705 may be constructed (act 915). The L2 header 705 may then be appended to the outgoing packet 700 (act 920). Additionally, any retrieved tag data 425 may be appended to packet 700 as a tag data header 710. The constructed packet may then be forwarded out interface 205 towards the packet's destination as indicated by the constructed header (act 925).

CONCLUSION

Consistent with the principles of the present invention, a data structure for storing encapsulation data conserves memory space by linking multiple tag descriptors to encapsulation data that is common to all of the tag descriptors. This common encapsulation data would, conventionally, be replicated for each instance of the tag descriptor, thereby, wasting memory space. By separating the tag descriptor (e.g., an MPLS descriptor) from the encapsulation data, memory is conserved and the memory demands on router memory is reduced.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. While a series of acts has been described in FIGS. 8-9, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A system, comprising:
   a memory configured to store:
      first data comprising a plurality of layer descriptors, each of the plurality of layer descriptors comprising encapsulation data utilized for constructing a packet header;
      second data comprising one or more tag descriptor data and associated layer descriptor pointers, the one or more tag descriptor data utilized for network traffic engineering and each of the associated layer descriptor pointers pointing to a respective layer descriptor of the plurality of layer descriptors; and
      third data comprising a multicast list, each entry of the multicast list comprising at least one of a tag descriptor pointer and a layer descriptor pointer, each tag descriptor pointer pointing to a respective tag descriptor data of the one or more tag descriptor data and each layer descriptor pointer pointing to a respective layer descriptor of the plurality of layer descriptors; and
   processing logic to:
      use at least one of the first, second or third data to construct a packet header for appending to a packet payload.

2. The system of claim 1, wherein each entry of the multicast list further comprises a data value identifying the entry as multicast list data.

3. The system of claim 1, wherein the second data further comprises a data value identifying the second data as tag descriptor data.

4. The system of claim 1, wherein the third data further comprises a data value identifying the third data as layer descriptor data.

5. The system of claim 1, wherein the second data further comprises a data value identifying a size of the tag descriptor data.

6. The system of claim 1, wherein the third data further comprises a data value identifying a size of the encapsulation data.

7. A method of constructing a packet, comprising:
   receiving a first pointer to an entry in a multicast list table, the entry comprising a second pointer to tag descriptor data stored in memory;
   utilizing the second pointer to retrieve the tag descriptor data, the tag descriptor data comprising a third pointer to encapsulation data stored in the memory;
   utilizing the third pointer to retrieve the encapsulation data;
   constructing a packet header utilizing the retrieved encapsulation data; and
   appending the packet header to a packet payload.

8. The method of claim 7, the tag descriptor data further comprising data utilized for network traffic engineering.

9. The method of claim 8, wherein the tag descriptor data is utilized with a label switching protocol.

10. The method of claim 9, wherein the label switching protocol comprises MPLS protocol.

11. The method of claim 7, the multicast list table comprising a plurality of entries, each entry of the plurality of entries comprising a data value identifying the entry as multicast list data.

12. A network device, comprising:
    a memory configured to store a multicast list table, tag descriptor data and layer encapsulation data; and
    a packet forwarding engine configured to:
    receive a first pointer to an entry in the multicast list table, the entry comprising a second pointer to the tag descriptor data,
    utilize the second pointer to retrieve the tag descriptor data, the tag descriptor data comprising a third pointer to the encapsulation data,
    utilize the third pointer to retrieve the encapsulation data,
    construct a packet header utilizing the retrieved encapsulation data, and
    append the packet header to a packet payload for forwarding out the packet forwarding engine.

13. The network device of claim 12, the tag descriptor data further comprising data utilized for network traffic engineering.

14. The network device of claim 13, wherein the tag descriptor data is utilized with a label switching protocol.

15. The network device of claim 14, wherein the label switching protocol comprises MPLS protocol.

16. The network device of claim 12, the multicast list table comprising a plurality of entries, each entry of the plurality of entries comprising a data value identifying the entry as multicast list data.

17. A network device, comprising:
    a memory configured to store a multicast list, tag descriptor data and layer encapsulation data;
    a first packet forwarding engine configured to:
    receive a packet,
    receive routing data for the packet,
    formulate a key based on the routing data, the key comprising a first pointer to the multicast list, and
    pass the packet and key to a second packet forwarding engine; and
    the second packet forwarding engine configured to:
    receive the packet and the key,
    retrieve a second pointer from the multicast list utilizing the first pointer, the second pointer pointing to the tag descriptor data,
    retrieve the tag descriptor data utilizing the second pointer,
    retrieve a third pointer from the tag descriptor data, the third pointer pointing to the encapsulation data,
    retrieve the encapsulation data utilizing the third pointer,
    construct a packet header utilizing the encapsulation data, and
    append the packet header to the packet to construct an outgoing packet.

18. The network device of claim 17, the tag descriptor data comprising data utilized for network traffic engineering.

19. The network device of claim 18, wherein the tag descriptor data is utilized with a label switching protocol.

20. The network device of claim 19, wherein the label switching protocol comprises MPLS protocol.

21. A system for constructing a packet, comprising:
    means for receiving a first pointer to an entry in a multicast list table, the entry comprising a second pointer to tag descriptor data stored in memory;
    means for utilizing the second pointer to retrieve the tag descriptor data, the tag descriptor data comprising a third pointer to encapsulation data stored in the memory;
    means for utilizing the third pointer to retrieve the encapsulation data;
    means for constructing a packet header utilizing the retrieved encapsulation data; and
    means for appending to packet header to a packet payload.

* * * * *